United States Patent
Chen

(10) Patent No.: US 7,844,776 B2
(45) Date of Patent: Nov. 30, 2010

(54) RAID CAPACITY EXPANSION HANDLING METHOD AND SYSTEM WITH CONCURRENT DATA ACCESS CAPABILITY

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 951 days.

(21) Appl. No.: 11/709,540

(22) Filed: Feb. 21, 2007

(65) Prior Publication Data

US 2008/0201525 A1    Aug. 21, 2008

(51) Int. Cl.
  *G06F 12/00* (2006.01)
  *G06F 13/00* (2006.01)

(52) U.S. Cl. .............. 711/114; 711/100; 711/113; 711/154

(58) Field of Classification Search .......... 711/100, 711/113, 114, 154
See application file for complete search history.

(56) References Cited

U.S. PATENT DOCUMENTS 5,564,116 A * 10/1996 Arai et al. ............ 714/7
5,574,851 A * 11/1996 Rathunde ............. 714/7
5,615,352 A *  3/1997 Jacobson et al. ...... 711/114

* cited by examiner

*Primary Examiner*—Tuan V. Thai
(74) *Attorney, Agent, or Firm*—Peter F. Corless; Steven M. Jensen; Edwards Angell Palmer & Dodge LLP

(57) ABSTRACT

A RAID capacity expansion handling method and system with concurrent data access capability is proposed, which is designed for use with a RAID (Redundant Array of Independent Disks) unit for providing a capacity-expanding function that allows the RAID unit to add just a single disk to an original disk cluster for expanding the total capacity thereof, and meanwhile allows a network server to concurrently gain access to the data stored in the RAID unit. This feature allows the capacity-expanding procedure for the RAID unit to be implemented in a more simplified manner with enhanced system performance.

9 Claims, 4 Drawing Sheets

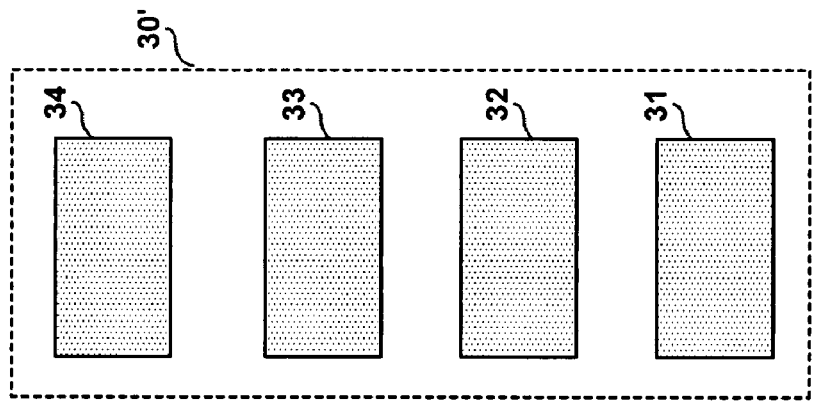
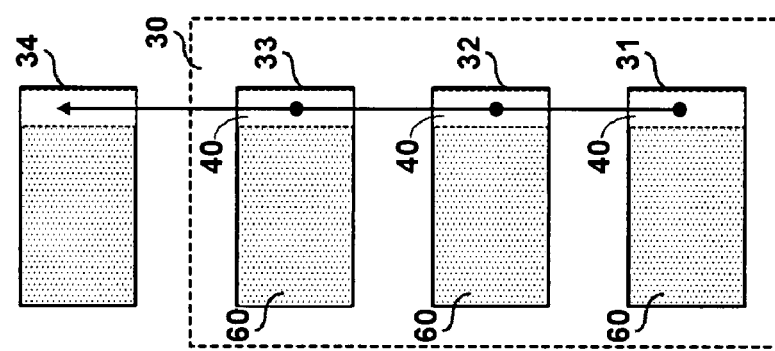
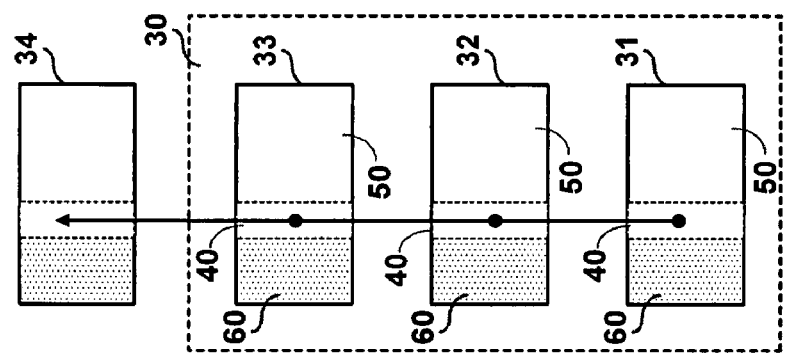
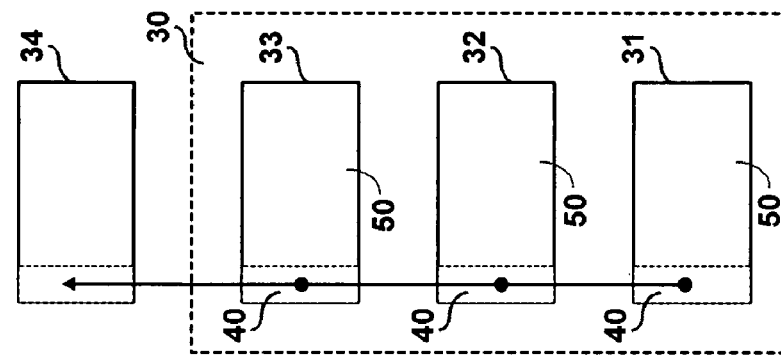

RAID CAPACITY EXPANSION HANDLING METHOD AND SYSTEM WITH CONCURRENT DATA ACCESS CAPABILITY

BACKGROUND OF THE INVENTION

1. Field of the Invention

This invention relates to information technology (IT), and more particularly, to a RAID capacity expansion handling method and system which is designed for use by a computer platform that is equipped with a disk array unit, such as a RAID (Redundant Array of Independent Disks) unit, for providing the RAID unit with a capacity expansion operation with concurrent data access capability that allows the RAID unit to be externally accessible by client stations during active runtime of the capacity expansion procedure.

2. Description of Related Art

RAID (Redundant Array of Independent Disks) is a multi-disk storage unit that contains two or more hard disks for providing a very large data storage capacity. A RAID unit is commonly connected to one or more servers in a network system for these servers to store the large amount of data that flow through the network system. Since a RAID unit contains multiple independent disks, it allows mirrored or interleaved data storage methods that can significantly enhance data access speed and also provide a multiple backup function that allows the storage of data to be highly reliable and secured.

In actual applications, the multiple disks of a RAID unit are grouped into one or more clusters, each cluster being used for serving a specific storage purpose, such as email server storage or file server storage. Presently, when the network management personnel wants to expand the total capacity of a certain disk cluster, a new disk cluster rather than a single disk should be added to the RAID unit.

One drawback to the above-mentioned practice, however, is that the newly-added disk cluster would have a different parity from the original disk cluster. This problem would considerably increase the complexity in data structure and programming, thus making the capacity expansion procedure difficult and complicated to realize.

Moreover, during active runtime of the capacity expansion procedure, it will inhibit the network server from gaining access to the RAID unit, i.e., the network server cannot read or write data on the RAID unit concurrently at the same time when the capacity expansion procedure is in active process. Therefore, when the capacity expansion procedure is running, the network server will temporarily halt its network services. This drawback will apparently degrade network system performance and serviceability.

SUMMARY OF THE INVENTION

It is therefore an objective of this invention to provide a RAID capacity expansion handling method and system which allows a RAID unit to carry out a capacity expansion procedure by adding a single disk to an existing disk cluster rather than adding another disk cluster.

It is another objective of this invention to provide a RAID capacity expansion handling method and system which allows a concurrent data access capability to the capacity expansion procedure so that network servers can gain access to the RAID unit during active runtime of the capacity expansion procedure.

The RAID capacity expansion handling method according to the invention comprises the following operations: (M1) duplicating each block of data stored in the original disk cluster by a predefined data length into a buffer memory area; (M2) rebuilding the data that are currently stored in the buffer memory area onto the newly-added disk under a prespecified disk array data storage mode; (M3) during runtime of the capacity expansion procedure, if the computer platform issues an access request to the disk array unit, responding by issuing an access address inspection enable message; (M4) responding to the access address inspection enable message by inspecting the relative location of the requested address of the access request in reference to current active expanding zone on the original disk cluster; (M5) if the requested address is within an already-expanded area, controlling an access operation on the newly-added disk to gain access to requested data; if the requested address is within an unexpanded area, controlling an access operation on the original disk cluster to gain access to requested data; and if the requested address is within the active expanding zone, inspecting the attribute of the access request; if the access request is a read request, controlling an access operation on the buffer memory area to gain access to requested data; otherwise, if the access request is a write request, returning a device busy message to the computer platform and inhibiting the access request until the rebuilding of the data in the current active expanding zone has completed.

In architecture, the RAID capacity expansion handling system comprises the following components: (A) a data buffer module, which includes a buffer memory area for temporary storage of each block of data that is to be duplicated from the original disk cluster to the newly-added disk during runtime of the capacity expansion procedure; (B) a data duplication module, which is capable of duplicating each block of data stored in the original disk cluster by a predefined data length into the buffer memory area of the data buffer module; (C) a rebuilding module, which is capable of rebuilding the data that are currently stored in the buffer memory area of the data buffer module onto the newly-added disk under a prespecified disk array data storage mode; (D) an access-request responding module, which is capable of responding to each access request issued to the disk array unit from the computer platform by issuing an access address inspection enable message; (E) an access address inspection module, which is capable of responding to the access address inspection enable message from the access-request responding module by inspecting the relative location of the requested address of the access request in reference to current active expanding zone on the original disk cluster; if the requested address is before the address range of the active expanding zone, capable of issuing a first access operation enable message; if the requested address is behind the address range of the active expanding zone, capable of issuing a second access operation enable message; and if the requested address is within the address range of the active expanding zone, capable of issuing a third access operation enable message; (F) a new disk cluster access control module, which is capable of responding to the first access operation enable message from the access address inspection module by controlling an access operation on the newly-added disk to gain access to requested data; (G) an original disk cluster access control module, which is capable of responding to the second access operation enable message from the access address inspection module by controlling an access operation on the original disk cluster to gain access to requested data; and (H) an active expanding zone access control module, which is capable of responding to the third access operation enable message from the access address inspection module by first inspecting the attribute of the access request; if the access request is a read request, capable of controlling an access operation on the buffer memory area of the data buffer module to gain access to requested data; otherwise, if the access request is a write request, capable of returning a device busy message to the computer platform and inhibiting the access request until the rebuilding of the data in the current active expanding zone has completed.

The RAID capacity expansion handling method and system according to the invention is characterized by the capability of allowing the RAID unit to add just a single disk to an original disk cluster for expanding the total capacity thereof, and concurrently allowing a network server to gain access to the RAID unit. This feature allows the capacity-expanding procedure for the RAID unit to be implemented in a more simplified manner with enhanced system performance and serviceability.

BRIEF DESCRIPTION OF DRAWINGS

The invention can be more fully understood by reading the following detailed description of the preferred embodiments, with reference made to the accompanying drawings, wherein:

FIGS. 4A-4D are schematic diagrams used to depict different stages of a capacity expansion procedure on a disk cluster.

DETAILED DESCRIPTION OF PREFERRED EMBODIMENTS

The RAID capacity expansion handling method and system according to the invention is disclosed in full details by way of preferred embodiments in the following with reference to the accompanying drawings.

Figure 1:
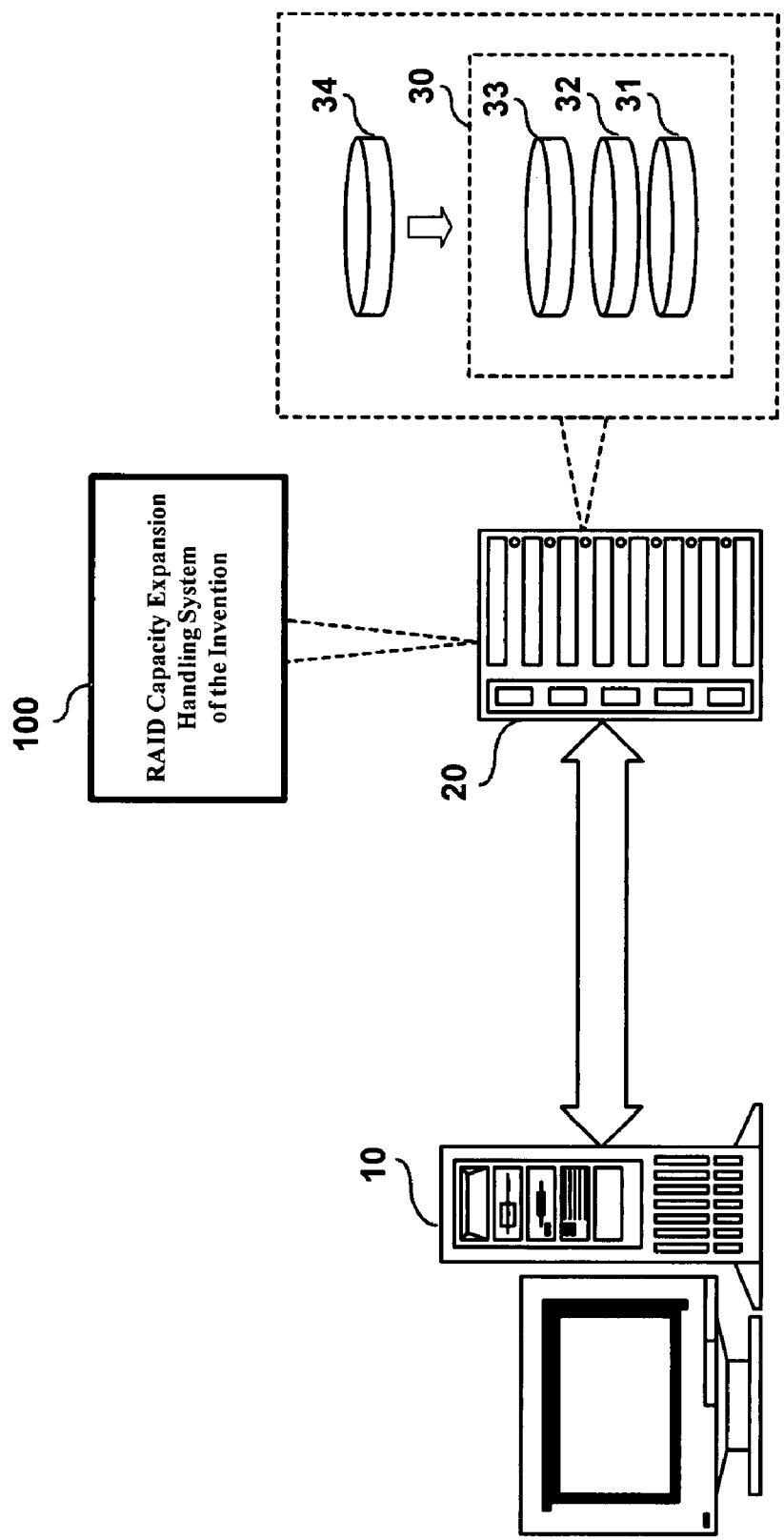
FIG. 1 is a schematic diagram showing the application of the RAID capacity expansion handling system of the invention.

FIG. 1 is a schematic diagram showing the application of the RAID capacity expansion handling system according to the invention (as the part encapsulated in the box indicated by the reference numeral 100). As shown, the RAID capacity expansion handling system of the invention 100 is designed for use by a computer platform 10, such as a network server, that is equipped with a disk array unit, such as a RAID (Redundant Array of Independent Disks) unit 20. In the example of FIG. 1, it is assumed that the RAID unit 20 includes a disk cluster 30 containing 3 disks 31, 32, 33 (it is to be noted that in practice, there is no restriction to the number of the disks in the cluster).

In actual application, it is assumed that network management personnel wants to add a new disk 34 to the disk cluster 30 for increasing the total capacity of the disk cluster 30. In this case, the network management personnel can start the RAID capacity expansion handling system of the invention 100 for performing a capacity expansion procedure on the RAID unit 20. It is a distinguishing feature of the invention that during active runtime of the capacity expansion procedure, external client stations (not shown) linked to the computer platform 10 can still gain access to the RAID unit 20 concurrently with the proceeding of the capacity expansion procedure.

Figure 2:
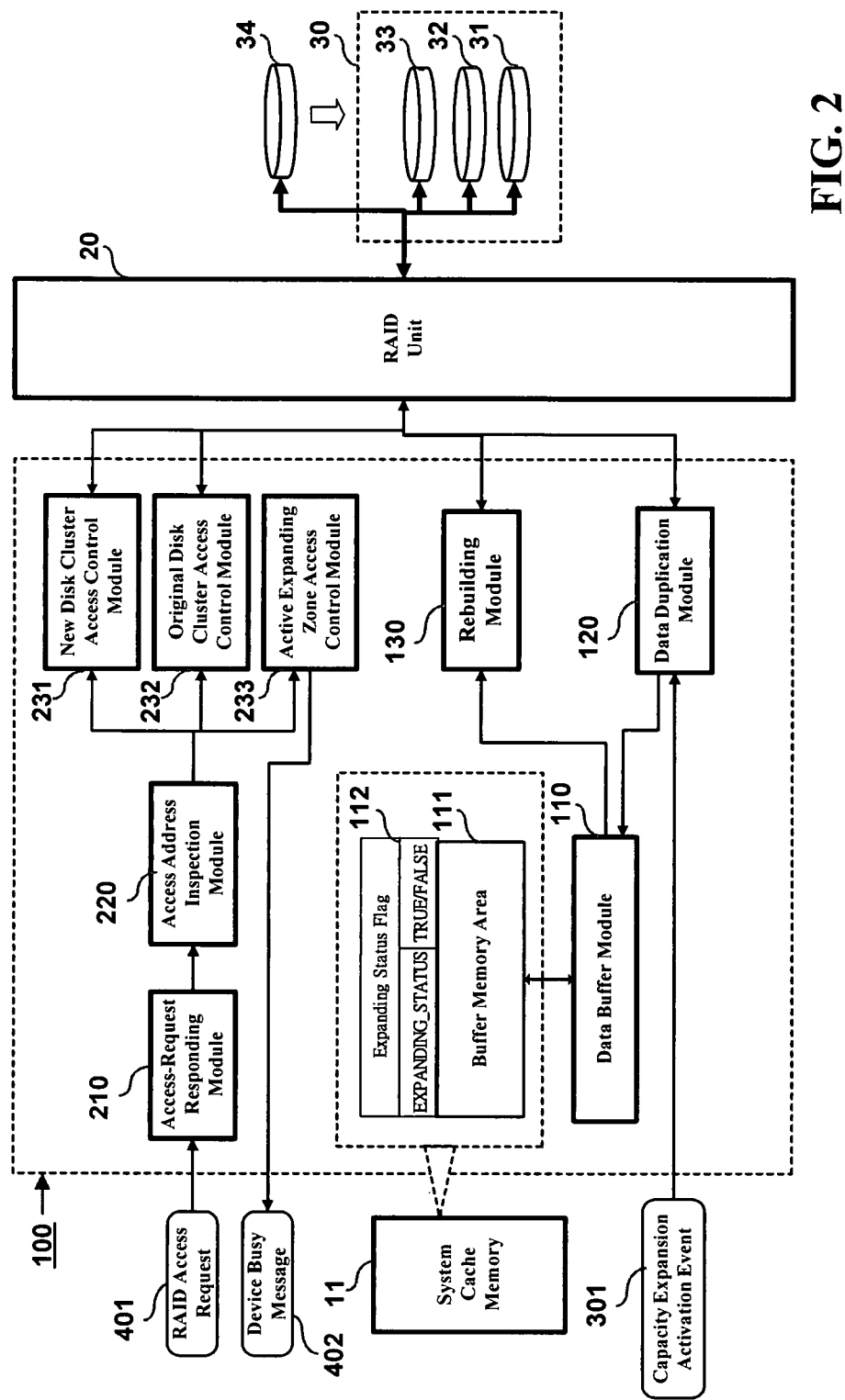
FIG. 2 is a schematic diagram showing a modularized architecture of the RAID capacity expansion handling system of the invention.

As shown in FIG. 2, the RAID capacity expansion handling system of the invention 100 is based on a modularized architecture which comprises: (A) a data buffer module 110; (B) a data duplication module 120; (C) a rebuilding module 130; (D) an access-request responding module 210; (E) an access address inspection module 220; (F) a new disk cluster access control module 231; (G) an original disk cluster access control module 232; and (H) an active expanding zone access control module 233. Firstly, the respective attributes and behaviors of these constituent modules are described in details in the following.

The data buffer module 110 includes a buffer memory area 111 and an expanding status flag 112 denoted by EXPANDING_STATUS; wherein the buffer memory area 111 is used for temporary storage of each block of data that is to be transferred from the original disk cluster 30 to the newly-added disk 34 during runtime of the capacity expansion procedure; and the EXPANDING_STATUS flag 112 is used to record a TRUE/FALSE value, where a TRUE value indicates that the buffer memory area 111 currently holds data that has been duplicated from the original disk cluster 30 and is waiting for rebuilding on the newly-added disk 34; while a FALSE value indicates that the buffer memory area 111 is currently empty (i.e., the next block of data for rebuilding on the newly-added disk 34 hasn't received yet, or the capacity expansion procedure is completed). When the EXPANDING_STATUS flag 112 is set to TRUE, it will inhibit the computer platform 10 from refreshing the data in the system cache memory 11 of the computer platform 10.

The data duplication module 120 is capable of duplicating each block of data stored in the original disk cluster 30 by a predefined data length into the data buffer module 110 during active runtime of the capacity expansion procedure. Preferably, the predefined data length is equal to the full capacity of the buffer memory area 111 in the data buffer module 110 (such as 128 KB or 256 KB). In the terminology of this specification, the storage area on the original disk cluster 30 where the duplication is in active operation will be herein and hereinafter referred to as "active expanding zone" and indicated by the reference numeral 40, as illustrated in FIGS. 4A-4C). When a block of data is duplicated into the buffer memory area 111, it will cause the EXPANDING_STATUS flag 112 to be set to TRUE.

The rebuilding module 130 is capable of rebuilding the data that are currently stored in the data buffer module 110 onto the newly-added disk 34 under a prespecified disk array data storage mode, for the purpose of rebuilding the data that were originally stored on the original disk cluster 30 onto the newly-added disk 34. In practice, the storage mode can be any standard RAID Level storage mode. After all the current data stored in the buffer memory area 111 are entirely rebuilt on the newly-added disk 34, the rebuilding module 130 will set the EXPANDING_STATUS flag 112 to FALSE.

The access-request responding module 210 is capable of responding to each RAID access request 401 from the computer platform 10 during runtime of the capacity expansion procedure on the RAID unit 20 by issuing an access address inspection enable message to the access address inspection module 220. The RAID access request 401 can be either a read request or a write request.

The access address inspection module 220 is capable of responding to the access address inspection enable message from the access-request responding module 210 by inspecting the relative location of the requested address of the RAID access request 401 in reference to the address range of the current active expanding zone 40 on the original disk cluster 30. If the requested address is before the active expanding zone 40 (i.e., within the already-expanded area 60 as illustrated in FIG. 4B and FIG. 4C), then the access address inspection module 220 will issue a first access operation enable message; if the requested address is behind the active expanding zone 40 (i.e., within the unexpanded area 50 as illustrated in FIG. 4A and FIG. 4B), then the access address inspection module 220 will issue a second access operation enable message; and if the requested address is within the active expanding zone 40, the access address inspection module 220 will issue a third access operation enable message.

The new disk cluster access control module 231 is capable of responding to the first access operation enable message from the access address inspection module 220 by controlling an access operation on the newly-established disk cluster 30' (i.e., the original set of disks 31, 32, 33 plus the newly-added disk 34) for the RAID access request 401 to gain access to the requested data.

The original disk cluster access control module 232 is capable of responding to the second access operation enable message from the access address inspection module 220 by controlling an access operation on the disk cluster 30 for the RAID access request 401 to gain access to the requested data from the original disk cluster 30.

The active expanding zone access control module 233 is capable of responding to the third access operation enable message from the access address inspection module 220 by first inspecting the attribute of the RAID access request 401 (i.e., whether it is a read request or a write request). If the access request is a read request, the active expanding zone access control module 233 will control an access operation on the buffer memory area 111 of the data buffer module 110 for the RAID access request 401 to read the requested data therefrom. On the other hand, if the access request is a write request, the active expanding zone access control module 233 will return a device busy message 402 to the computer platform 10 and inhibit any further attempts to write data to the address range of the current active expanding zone 40 until the current active expanding zone 40 has completed expansion.

The following is a detailed description of a practical application example of the RAID capacity expansion handling system of the invention 100 in actual operation. In this application example, it is assumed that the total capacity of the disk cluster 30 is about to be used up, so that the network management personnel adds a new disk 34 to the disk cluster 30, and then starts the RAID capacity expansion handling system of the invention 100 to perform a capacity expansion procedure for the newly-added disk 34 (as the activity P10 shown in FIG. 3).

Figure 3:
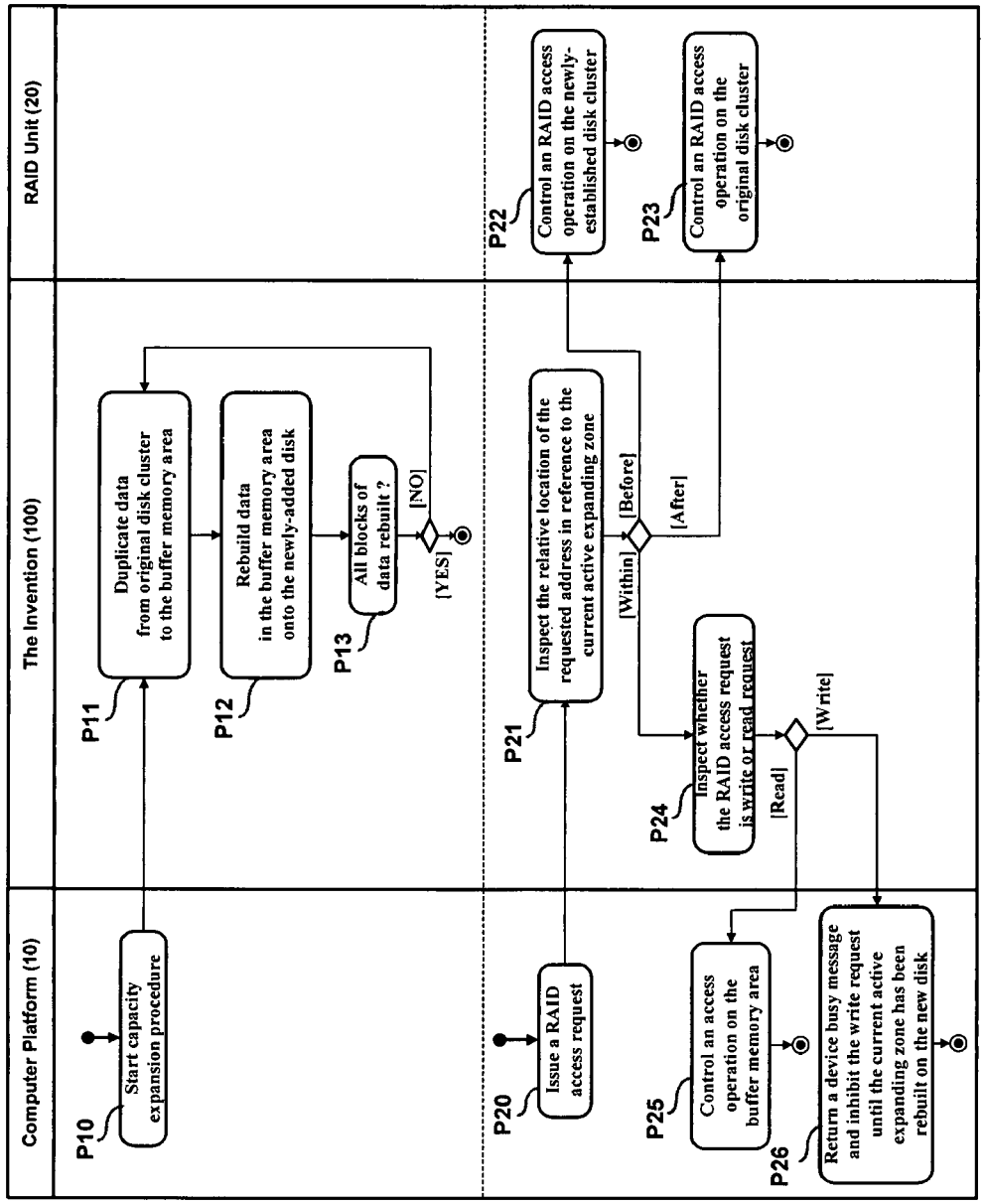
FIG. 3 is an activity diagram showing the activities performed by the RAID capacity expansion handling system of the invention.

After the capacity expansion procedure is started (i.e., a capacity expansion activation event 301 occurs on the computer platform 10), the data duplication module 120 is activated to duplicating each block of data stored in the original disk cluster 30 by a predefined data length (such as 128 KB or 256 KB) into the buffer memory area 111 of the data buffer module 110 (as the activity P11 shown in FIG. 3). After a block of data is duplicated into the buffer memory area 111, it will cause the EXPANDING_STATUS flag 112 to be set to TRUE.

During the foregoing data duplication and buffering procedure, if the computer platform 10 issues no access requests to the RAID unit 20, the rebuilding module 130 is activated to rebuild the data that are temporarily stored in the buffer memory area 111 of the data buffer module 110 onto the newly-added disk 34 under a prespecified disk array data storage mode (as the activity P12 shown in FIG. 3). The activity P12 rebuilds the data that were originally stored on the original disk cluster 30 onto the newly-added disk 34. Next, it is checked that whether all blocks of data on the disk cluster 30 have been rebuilt on the newly-added disk 34 (as the activity P13 shown in FIG. 3); if yes, the capacity expansion procedure is ended; otherwise, the activities P11 through P13 are repeated until all blocks of data on the disk cluster 30 have been rebuilt on the newly-added disk 34 and whereupon a new disk cluster 30' is established, as illustrated in FIG. 4D. After the current data stored in the buffer memory area 111 is entirely rebuilt on the newly-added disk 34, the rebuilding module 130 will set the EXPANDING_STATUS flag 112 to FALSE.

On the other hand, if the computer platform 10 issues a RAID access request 401 (which can be either a read request or a write request) to the RAID unit 20 (as the activity P20 shown in FIG. 3), the access-request responding module 210 is responsively activated to issue an access address inspection enable message to the access address inspection module 220, and whereupon the access address inspection module 220 is activated to inspect the relative location of the requested address of the RAID access request 401 in reference to the address range of the current active expanding zone 40 on the original disk cluster 30 (as the activity P21 shown in FIG. 3). If the requested address is before the active expanding zone 40, then the access address inspection module 220 issues a first access operation enable message to the new disk cluster access control module 231 for the activation of the activity P22 shown in FIG. 3; if the requested address is behind the active expanding zone 40, then the access address inspection module 220 issues a second access operation enable message to the original disk cluster access control module 232 for the activation of the activity P23 shown in FIG. 3; and if the requested address is within the active expanding zone 40, the access address inspection module 220 issues a third access operation enable message to the active expanding zone access control module 233 for the activation of the activity P24 shown in FIG. 3.

During the activity P22, the new disk cluster access control module 231 is activated to control a RAID access operation on the newly-established disk cluster 30' (i.e., the original set of disks 31, 32, 33 plus the newly-added disk 34) for the RAID access request 401 to gain access to the requested data.

During the activity P23, the original disk cluster access control module 232 is activated to control a RAID access operation on the original disk cluster 30 for the RAID access request 401 to gain access to the requested data from the original disk cluster 30.

During the activity P24, the active expanding zone access control module 233 is activated to first inspect the attribute of the RAID access request 401 (i.e., whether it is a read request or a write request). If the access request is a read request, the procedure jumps to the activity P25; and if a write request, the procedure jumps to the activity P26. During the activity P25, the active expanding zone access control module 233 controls an access operation on the buffer memory area 111 of the data buffer module 110 for the RAID access request 401 to read the requested data therefrom. On the other hand, During the activity P26, the active expanding zone access control module 233 returns a device busy message 402 to the computer platform 10 and inhibit any further attempts to write data to the address range of the current active expanding zone 40 until the current active expanding zone 40 has completed expansion.

In conclusion, the invention provides a RAID capacity expansion handling method and system which is designed for use with a RAID unit, and which is characterized by the capability of allowing the RAID unit to add just a single disk to an original disk cluster for expanding the total capacity thereof, and concurrently allowing a network server to gain access to the RAID unit. This feature allows the capacity-expanding procedure for the RAID unit to be implemented in a more simplified manner with enhanced system performance and serviceability. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A disk array unit capacity expansion handling method for use by a computer platform that is equipped with a disk array unit having a cluster of disks for performing a capacity expansion procedure on the disk array unit when a new disk is added to the disk cluster, the disk array unit capacity expansion handling method comprising:

duplicating each block of data stored in the original disk cluster by a predefined data length into a buffer memory area;

rebuilding the data that are currently stored in the buffer memory area onto the newly-added disk under a prespecified disk array data storage mode;

during runtime of the capacity expansion procedure, if the computer platform issues an access request to the disk array unit, responding by issuing an access address inspection enable message;

responding to the access address inspection enable message by inspecting the relative location of the requested address of the access request in reference to current active expanding zone on the original disk cluster;

if the requested address is within an already-expanded area, controlling an access operation on the newly-added disk to gain access to requested data;

if the requested address is within an unexpanded area, controlling an access operation on the original disk cluster to gain access to requested data; and if the requested address is within the active expanding zone, inspecting the attribute of the access request; if the access request is a read request, controlling an access operation on the buffer memory area to gain access to requested data; otherwise, if the access request is a write request, returning a device busy message to the computer platform and inhibiting the access request until the rebuilding of the data in the current active expanding zone has completed, wherein if the requested address of the access request is before the address range of the active expanding zone, then the requested address is determined to have been rebuilt on the newly-added disk and the disk array unit is informed to read the newly-added disk during runtime of the capacity expansion procedure; whereas if the requested address is after the address range of the active expanding zone, then the requested address is determined to have not been rebuilt and the disk array unit is informed to read the original disk cluster during runtime of the capacity expansion procedure.

2. The disk array unit capacity expansion handling method of claim 1, wherein the computer platform is a network server.

3. The disk array unit capacity expansion handling method of claim 1, wherein the disk array unit is a RAID (Redundant Array of Independent Disks) compliant unit.

4. The disk array unit capacity expansion handling method of claim 1, wherein the buffer memory area is a predefined partition in a system cache memory of the computer platform.

5. A disk array unit capacity expansion handling system with concurrent data access capability for use by a computer platform that is equipped with a disk array unit having a cluster of disks for performing a capacity expansion procedure on the disk array unit when a new disk is added to the disk cluster, the disk array unit capacity expansion handling system comprising:

a data buffer module, which includes a buffer memory area for temporary storage of each block of data that is to be duplicated from the original disk cluster to the newly-added disk during runtime of the capacity expansion procedure;

a data duplication module, which is capable of duplicating each block of data stored in the original disk cluster by a predefined data length into the buffer memory area of the data buffer module;

a rebuilding module, which is capable of rebuilding the data that are currently stored in the buffer memory area of the data buffer module onto the newly-added disk under a prespecified disk array data storage mode;

an access-request responding module, which is capable of responding to each access request issued to the disk array unit from the computer platform by issuing an access address inspection enable message;

an access address inspection module, which is capable of responding to the access address inspection enable message from the access-request responding module by inspecting the relative location of the requested address of the access request in reference to current active expanding zone on the original disk cluster; if the requested address is before the address range of the active expanding zone, capable of issuing a first access operation enable message; if the requested address is behind the address range of the active expanding zone, capable of issuing a second access operation enable message; and if the requested address is within the address range of the active expanding zone, capable of issuing a third access operation enable message;

a new disk cluster access control module, which is capable of responding to the first access operation enable message from the access address inspection module by controlling an access operation on the newly-added disk to gain access to requested data during runtime of the capacity expansion procedure;

an original disk cluster access control module, which is capable of responding to the second access operation enable message from the access address inspection module by controlling an access operation on the original disk cluster to gain access to requested data during runtime of the capacity expansion procedure; and an active expanding zone access control module, which is capable of responding to the third access operation enable message from the access address inspection module by first inspecting the attribute of the access request; if the access request is a read request, capable of controlling an access operation on the buffer memory area of the data buffer module to gain access to requested data; otherwise, if the access request is a write request, capable of returning a device busy message to the computer platform and inhibiting the access request until the rebuilding of the data in the current active expanding zone has completed.

6. The disk array unit capacity expansion handling system of claim 5, wherein the computer platform is a network server.

7. The disk array unit capacity expansion handling system of claim 5, wherein the disk array unit is a RAID (Redundant Array of Independent Disks) compliant unit.

8. The disk array unit capacity expansion handling system of claim 5, wherein the buffer memory area of the data buffer module is a predefined partition in a system cache memory of the computer platform.

9. The disk array unit capacity expansion handling system of claim 5, wherein the data buffer module further includes a capacity-expansion status flag for indicating whether the buffer memory area of the data buffer module still contain data that haven't yet rebuilt on the newly-added disk.

* * * * *